United States Patent [19]

Southworth et al.

[11] 4,425,706

[45] Jan. 17, 1984

[54] CUTTING TOOL

[76] Inventors: William W. Southworth; Elaine D. Southworth, both of 2731 Jolly La., Chester, Va. 23831

[21] Appl. No.: 343,116

[22] Filed: Jan. 27, 1982

[51] Int. Cl.³ .............................................. A21C 5/00
[52] U.S. Cl. ...................................................... 30/116
[58] Field of Search .................................. 30/116, 117

[56] References Cited

U.S. PATENT DOCUMENTS

| | | | |
|---|---|---|---|
| 185,822 | 1/1877 | Eveleth et al. | 30/117 |
| 1,540,246 | 6/1925 | Blassie | 30/117 |
| 1,623,833 | 4/1927 | Geis | 30/116 |
| 2,112,447 | 3/1938 | Peterson | 30/116 |
| 2,417,172 | 3/1947 | Norman | 30/116 |
| 2,533,682 | 12/1950 | Nelson | 30/116 |

FOREIGN PATENT DOCUMENTS

| | | | |
|---|---|---|---|
| 1034341 | 4/1953 | France | 30/116 |
| 120215 | 5/1927 | Switzerland | 30/116 |
| 13713 | of 1910 | United Kingdom | 30/116 |
| 8073 | of 1913 | United Kingdom | 30/116 |
| 628826 | 9/1949 | United Kingdom | 30/116 |

*Primary Examiner*—James L. Jones, Jr.

*Attorney, Agent, or Firm*—George N. Woodruff

[57] ABSTRACT

A cutting tool for sectioning cakes or other foodstuffs, for removing the crown from a cake while it is still in the pan or after it has been removed therefrom, for slicing the cake or foodstuff into any number of horizontal layers and/or dividing the cake or foodstuff into any desired vertical sections. For simply sectioning the cake or foodstuff into horizontal sections or removing the crown from a cake the tool is provided with two notched vertical blades spaced apart to span the cake or foodstuff and a cutting strand is disposed between the blades and drawn through the cake or foodstuff. For simply cutting the cake or foodstuff into vertical sections the cutting strand is removed and two or more vertical blades are spaced apart the desired width and using the edge of the pan or the edge of the cake as a guide for one blade, the tool is drawn through the cake or foodstuff. If additional sectioning is required the blades may then be repositioned to make further spaced vertical cuts. For simultaneously removing the crown from a cake and cutting the cake into spaced vertical sections the cutting strand may be disposed between multiple spaced vertical blades.

4 Claims, 7 Drawing Figures

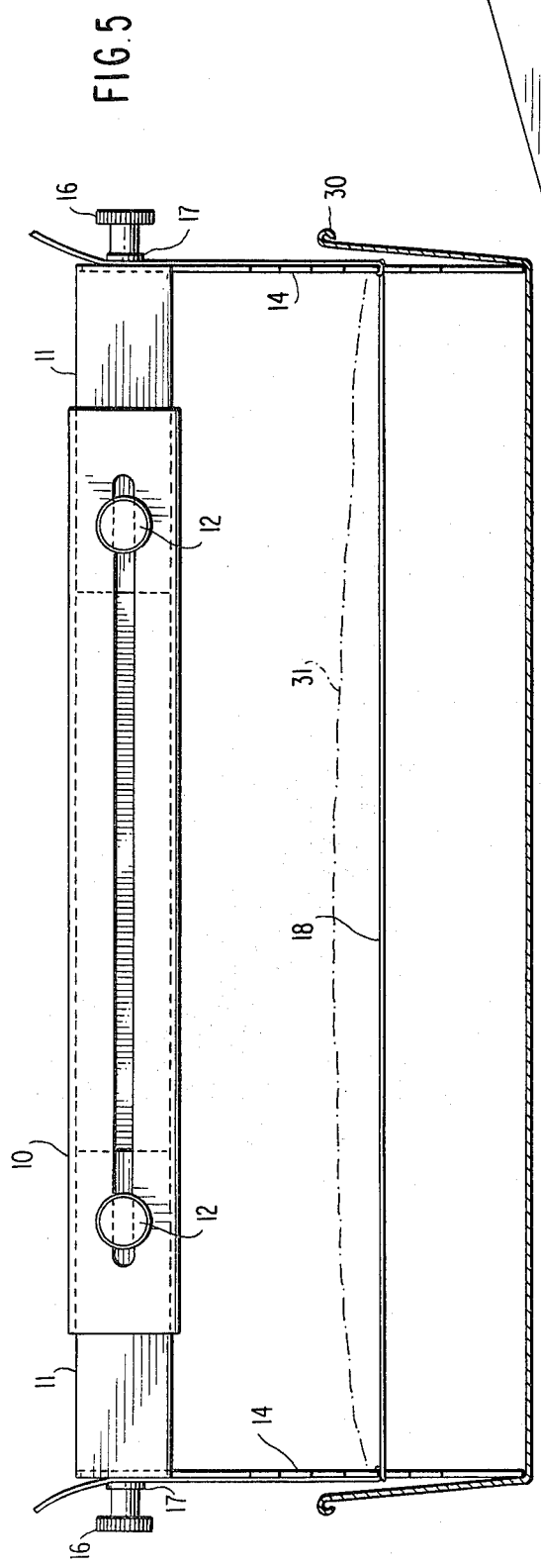
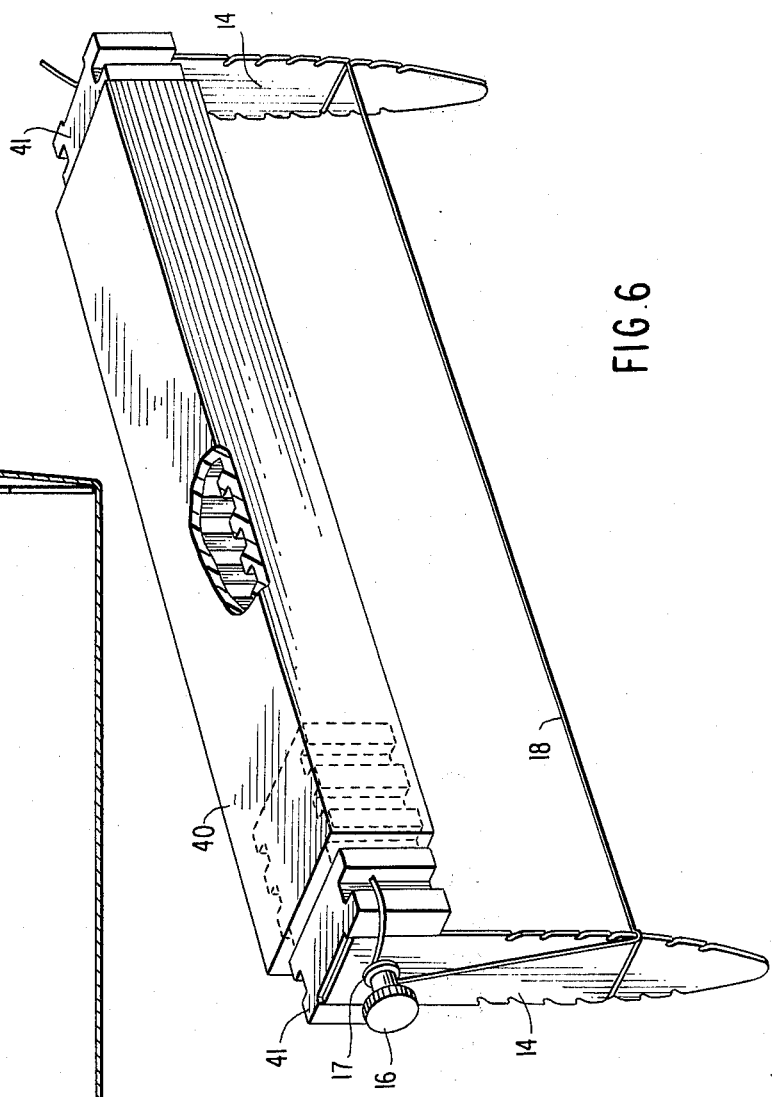
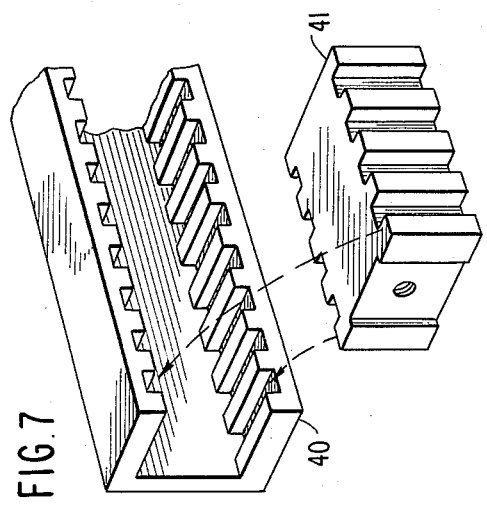

CUTTING TOOL

In the preparation of decorated cakes and, in particular, the preparation of multiple layered cakes it is essential that the cake decorator work with an absolutely flat surface. Cakes, however, come out of the oven with a crown on their upper surface and it is necessary for the decorator to remove this crown and to make the upper surface flat and parallel with the bottom of the cake. In the preparation of some layer cakes it may also be desirable to section the cake into thinner horizontal layers so as to make a cake with a number of thin layers with icing between them.

In the preparation of some smaller cakes, which are formed from larger cakes, such as petits fours or brownies, it is also necessary for the baker or cake decorator to section the cake into precisely spaced vertically cut sections. This can be done with a knife and a straight edge but the process is time consuming and generally requires that the cake be removed from the pan prior to sectioning.

The present invention contemplates a cutting tool which can cut a cake into any desired horizontal or vertical sections, is simple enough in operation and construction so as to permit its use by housewives as well as small bakeries, and which can be used while the cake is still in the pan in which it was baked or following removal from the pan.

A tool for slicing a cake into horizontal sections and removing the crown is disclosed in U.S. Pat. No. 2,964,844, however use of this device requires that the cake be removed from the pan in order to section it.

Another device for horizontally sectioning cakes is disclosed in U.S. Pat. No. 3,388,469 but this tool can only be used while the cake is still in the pan. Neither tool provides means for vertically sectioning the foodstuff into rectangular or square pieces. The present invention contemplates a tool which can be used while the cake is still in the pan or following removal therefrom and which is also useable for vertically cutting the cake into precisely spaced sections.

It is an object of the present invention to provide a cutting tool for cakes or other foodstuffs which can be adjusted to fit within any size cake pan or to span a cake or foodstuff after it has been removed from the pan to remove the crown from the cake or to section the cake or foodstuff into measured horizontal layers.

It is a further object of this invention to provide a cutting tool for cakes or other foodstuffs which can also be adjusted to vertically section cakes or other foodstuffs into any desired rectangular sections while the cake is in the pan or following removal therefrom.

It is also an objective of this invention to provide a cutting tool for cakes or foodstuffs which can simultaneously section the material into horizontal and spaced vertical sections.

It is yet another objective of this invention to provide a cutting tool for cakes or foodstuffs which is readily disassemblable for cleaning.

BRIEF SUMMARY OF THE INVENTION

In the present invention at least two notched blades are spaceably mounted in a handle. For simply sectioning the cake or foodstuff horizontally or removing the crown from the cake, a cutting strand which may be a wire or a monofilament line is disposed between two blades spaced apart so as to span the cake or foodstuff whether in the pan or after removal from the pan. The cutting strand is secured by the notches and at the handle. The tool is then drawn through the cake or foodstuff with the notches providing precise vertical spacing of the cutting strand from the bottom of the pan or the cutting board. In order to simply section a cake into vertical sections the cutting strand is removed and the blades spaced apart the desired distance and drawn through the cake, using one edge of the cake or the edge of the pan as a guide. The cutting blades may then be repositioned any number of times to divide the cake into the desired number of vertical sections. If it is desired to section the cake vertically into a large number of sections additional cutting blades may be installed in the handle to provide a number of vertical cuts with one pass through the cake or foodstuff. In this mode the tool may also be used to remove the crown from a cake and simultaneously divide it into a number of spaced vertical sections by disposing the cutting strand between the multiple blades.

BRIEF DESCRIPTION OF THE DRAWINGS

FIG. 5 is a front view of the tool in use.

FIG. 6 is an isometric view of the tool using a different blade spacing means.

FIG. 7 is an isometric detail of the alternate blade spacing means.

DETAILED DESCRIPTION OF THE INVENTION

Figure 1:
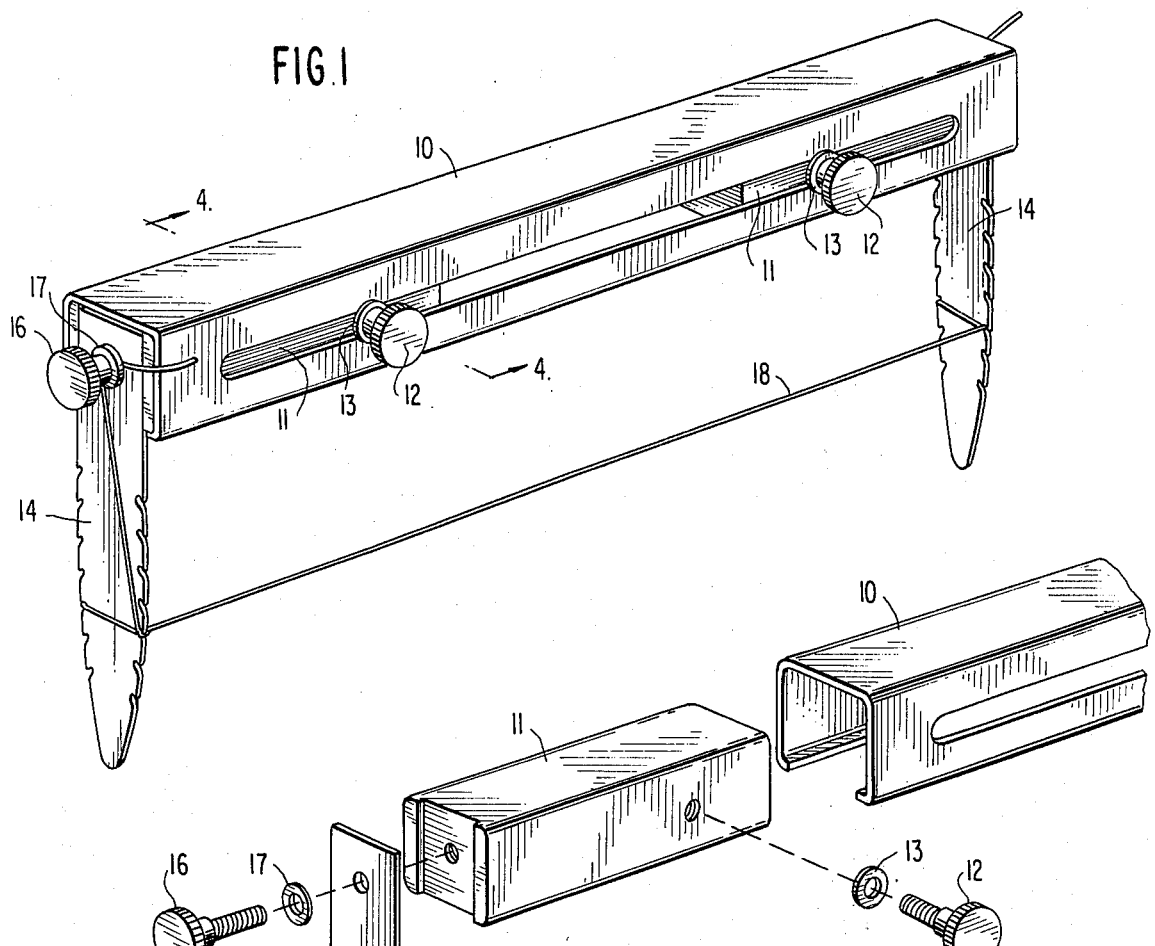
FIG. 1 is an isometric view of the cutting tool assembled for horizontally sectioning a cake or foodstuff.

Referring now to FIG. 1 which shows the tool in its assembled, operable form for horizontally sectioning a cake or foodstuff, a handle member 10 is provided to retain two blade carriers 11 whose horizontal spacing can be adjusted by means of screws 12 and washers 13 extending through slots in the handle. Notched blades 14 are secured to the blade carriers 11 by means of screws 16 and washers 17. Screws 16 and washers 17 also serve to secure cutting strand 18 which extends down to the notches in blades 14 and is then horizontally tensioned between the blades.

While this illustration shows a balanced tool with both blades adjustable so that they may be centered in the handle member, which has proven in practice to be more conveniently operable, it is obvious to those of ordinary skill in the art that the handle itself can be used as a fixed blade carrier with one blade mounted at the end of the handle without departing from the spirit of the invention.

Figure 2:
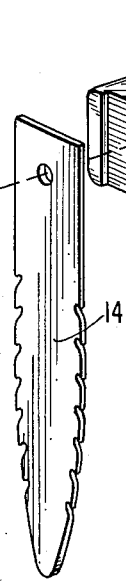
FIG. 2 is an isometric exploded view of the blade assembly.

Referring now to FIG. 2 an exploded detail of the assembly of one blade carrier 11, together with Blade 14 and the associated mounting screws and washers 16 and 17 and 12 and 13. This detail shows the groove in the end of blade carrier 11 for receiving blade 14 which prevents blade 14 from rotating around the axis of screw 16 when the tool is in use. Alternatively the blade and blade carrier may be formed as a single element by stamping and forming a single metal or plastic piece into the appropriate shape.

Figure 3:
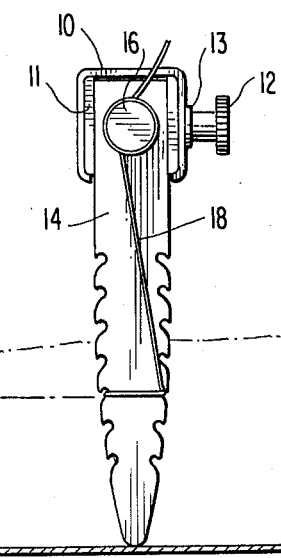
FIG. 3 is an end view of the tool in operation.

FIG. 3 shows an end view of the tool in operation, removing the crown from a cake 31, contained within a pan 30.

Figure 4:
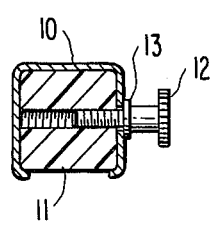
FIG. 4 is a section view of the blade carrier.

FIG. 4 shows a detail of a blade carrier showing that the interior screw thread extends through the carrier so that the carrier and blade may be reversed to permit closer horizontal spacing between the blades when the tool is being used for vertical cutting operations.

FIG. 5 shows a sectional front view of the tool in operation being drawn through a cake 31 contained in a pan 30 for removing the crown therefrom. It can be appreciated that the cutting tool would also function in the same manner if the cake 31 was removed from pan 30 and placed on a level surface.

While the detail of making vertical cuts through the cake or foodstuff is not specifically illustrated it may be appreciated from this figure that with the cutting strand removed and, for example the right cutter blade repositioned, that the tool will vertically section the cake or foodstuff, using the left blade as a fixed guide in contact with the edge of the pan.

It may also be appreciated that with the cutting strand in place and the right blade repositioned toward the center of the cake that the tool will make a simultaneous vertical and horizontal sectioning of the cake.

It is also obvious that additional blade carriers and blades may be inserted into the handle to provide multiple vertical cuts with one pass through the cake or foodstuff.

While the foregoing discussion has addressed itself to a tool having infinitely variable spacing between the blades by means of screw adjustments, a more simple tool for achieving the same ends may be constructed having a limited number of fixed spacings between the elements by means of tongue and slot members as shown in FIG. 6. Since most cake pans are of even dimensions, e.g. 6",8",10" etc. this spacing method is adapable to general household use where only a few regular sized pans are employed. FIG. 7 shows a detail of the mating of tongue and groove in a tool employing this method of variably spacing the blade carrier in the handle.

While for purposes of illustration I have described several embodiments of my invention it will be apparent to those skilled in the art that changes or modifications thereof can be made therein and it is intended that this invention cover these changes within the scope of the following claims.

I claim:

1. A cutting tool for spaceably horizontally and vertically sectioning cakes or other foodstuffs comprising a U shaped handle member open at the bottom, a plurality of blade carriers for insertion in said handle member and for holding individual cutting blades, means for securing said blade carriers in position within said handle member, cutting blades extending vertically from said blade carriers forming a plurality of cutting edges perpendicular to the longitudinal axis of said handle member, said blades having spaced notches on the edges thereof, a removable cutting strand disposable between said cutting blades in said notches forming one or more cutting edges parallel to the longitudinal axis of said handle and means for securing said cutting strand to maintain tension when disposed between the cutting blades, forming a cutting tool which when drawn through a cake or foodstuff simultaneously cuts it into spaced vertical and horizontal sections or with the cutting strand removed cuts the cake or foodstuff into spaced vertical sections.

2. The tool of claim 1 wherein the handle member is provided with one or more slots therein and the blade carriers are slideable within the handle member and secured in position by fasteners extending through the slots into the blade carriers.

3. The tool of claim 1 wherein the handle member is provided with a continuous series of tongues and grooves on the inner walls thereof and the blade carriers are provided with matching tongues and grooves on the outer walls thereof for mating engagement with those of the handle member, securing the blade carriers in incremental positions within the handle member by frictional and spatial engagement.

4. The tool of claim 1 wherein the blade carriers and blades are integrally formed as single elements.

* * * * *